United States Patent
Masayoshi

[11] Patent Number: 5,990,937
[45] Date of Patent: Nov. 23, 1999

[54] CAMCORDER INTEGRALLY INCORPORATING A STILL CAMERA

[75] Inventor: Urushidani Masayoshi, Osaka, Japan

[73] Assignee: Samsung Electronics Co., Ltd., Kyungki-do, Rep. of Korea

[21] Appl. No.: 08/639,912

[22] Filed: Apr. 26, 1996

[30] Foreign Application Priority Data

Apr. 28, 1995 [JP] Japan ................................ 7-106269

[51] Int. Cl.$^6$ ........................................ H04N 5/225
[52] U.S. Cl. ............................................... 348/64
[58] Field of Search .................... 348/348, 220, 348/221, 140, 139, 121, 64; 396/429, 322, 343, 344, 107, 109, 139, 140, 29, 80, 89, 121, 82

[56] References Cited

U.S. PATENT DOCUMENTS

| | | | |
|---|---|---|---|
| 4,742,369 | 5/1988 | Ishii | 348/232 |
| 4,788,565 | 11/1988 | Masuda | 348/64 |
| 4,829,383 | 5/1989 | Harase | 348/64 |
| 4,829,384 | 5/1989 | Iida | 348/64 |
| 4,862,280 | 8/1989 | Iida | 348/64 |
| 4,924,247 | 5/1990 | Suzuki et al. | 348/348 |
| 4,937,673 | 6/1990 | Saito | 348/64 |
| 4,949,117 | 8/1990 | Van Heyningen | 348/64 |
| 4,978,983 | 12/1990 | StAlfors | 348/64 |
| 5,150,215 | 9/1992 | Shi | 348/64 |
| 5,680,648 | 10/1997 | Nonaka | 396/109 |
| 5,710,954 | 1/1998 | Inoue | 396/374 |

*Primary Examiner*—Wendy Gerber
*Attorney, Agent, or Firm*—Sughrue, Mion, Zinn, Macpeak & Seas, PLLC

[57] ABSTRACT

A camcorder integrally incorporating a still camera and using an automatic focusing device of the still camera or the camcorder is provided. A still camera main body and an optical viewfinder of the still camera are installed at the right front side of the main body of a camcorder, and a still camera lens, an infrared emitting element for measuring distance, an infrared receiving element for measuring distance, a flash and the like are installed at the main body of the still camera. Therefore, when a focus of an object is difficult to control, e.g., when the object is in the dark or when there is no contrast between the object and the background, the focusing direction of the camcorder lens is moved using the data of distance measured by a distance measuring device adopting an infrared mode installed in the still camera, so that a picture photographed by an instant camera function or a frash recording function can be stored in the picture memory of the camcorder.

29 Claims, 4 Drawing Sheets

(DISTANCE 10m)

(DISTANCE 1m)

CAMCORDER INTEGRALLY INCORPORATING A STILL CAMERA

BACKGROUND OF THE INVENTION

The present invention relates to a camcorder having a still camera integrally formed therein, and more particularly to a camcorder integrally incorporating a still camera in which a camcorder portion using a magnetic tape as the recording medium and a still camera portion using a photographic film as the recording medium are integrally formed in one body, and a distance measuring device of the camera controls the focus of the camcorder and vice versa.

A camcorder for magnetically recording a moving picture on a magnetic tape and a still camera for forming a still picture by exposing a photographic film to light reflected from an object have each been developed as separate apparatuses. In order to record an object magnetically and photographically using both the camcorder and the still camera, one must bear the inconvenience of having to carry both the camcorder and the still camera for the duration of the photographing/recording period. Also, the camcorder must be paused or stopped in order to take a picture using the still camera.

To alleviate the above inconveniences, a camcorder in which a still camera is integrally formed has been developed. However, there are several problems due to the lenses of the still camera and the camcorder being separated and working independently. First, due to the difference in the view of an object as seen through the picture-taking lens of the still camera and the view as seen through a separate viewfinder or monitor of the camcorder, parallax occurs. Thus, when photographing an object using the still camera while viewing an object displayed on a monitor focused by the camcorder, or recording the object using the camcorder while viewing the object through an optical viewfinder focused by the a still camera, there is a conflict of focus. Also, assuming that the objects recorded by the camcorder is displayed on a liquid crystal display (LCD) installed at the rear side, it is difficult to determine the viewing angle of the still camera when viewing the LCD in order to focus on the same object since the automatic focus (AF) devices for the camcorder and the still camera work independently. Another problem is that the AE device of the camcorder adopts an algorithm for maximizing a high frequency component of a picture signal. Therefore, it is difficult to focus when the picture signal is weak, for example, when an object to be photographed is dark or when there is little or no contrast (ratio of lightness to darkness) between the object and the background. Furthermore, since the AF device of the camcorder has a long time constant, it is impossible to measure distance in the near instant time span of illumination during flash photography. Especially, when intending to store a picture in a picture memory with the picture being captured by the camcorder using the flash in dark situations, it is impossible to focus on the object by operating the AF device of the camcorder prior to the illumination by the flash.

SUMMARY OF THE INVENTION

To solve the above problems, it is an object of the present invention to provide a camcorder integrally incorporating a still camera which can control the focuses of a still camera and a camcorder using an automatic focusing device of the still camera or the camcorder.

To achieve the above object, there is provided a camcorder integrally incorporating a still camera in which a camcorder having a first distance measuring device for measuring a first distance to an object which records a signal of moving pictures of the object on a magnetic tape and a still camera having a second distance measuring device for measuring a second distance to the object which forms a still photograph by exposing a photographic film to light reflected from the object are integrally formed, the camcorder comprising an automatic focus controlling means for performing a bi-directional automatic focus control with respect to both the (camcorder and the still camera on the basis of data of distance to the object measured by the first or second distance measuring device.

It is preferable that the automatic focus controlling means comprise a switching means for performing an automatic focus control of the camcorder on the basis of data of distance measured by the second distance measuring device installed in the still camera.

Also, preferably, the automatic focus controlling means further comprises a direction adjusting means for changing the direction of the second distance measuring device towards the photographing direction of the camcorder.

Also, there is provided a camcorder integrally incorporating a still camera in which a camcorder for recording motion picture signals of an object and a still camera for forming a still photograph by exposing a photographic film to light reflected from the object are integrally formed, and a picture memory for storing the picture image signals is also provided, the camcorder further comprising a means for controlling the storage of captured picture image signals on the basis of the data of distance measured by a distance measuring device installed in the still camera.

Also, there is provided a camcorder integrally incorporating a still camera in which a camcorder having a first distance measuring device for measuring a first distance to an object to record a signal of moving pictures of the object on a magnetic tape, a still camera having a second distance measuring device for measuring a second distance to the object to form a still photograph by exposing a photographic film to light reflected from the object, and a display device for displaying pictures recorded by the camcorder are formed, the camcorder integrally comprising a direction adjusting means for changing the distance measuring direction of the second distance measuring device so that it corresponds to the direction of the object displayed at the center of the display device.

In addition, there is provided a camcorder integrally incorporating a still camera in which a camcorder having a first distance measuring device for measuring a first distance to an object and a first controller for controlling the first distance measuring device, which records a signal of moving pictures of an object on a magnetic tape, and a still camera having a second distance measuring device for measuring a second distance to the object and a second controller for controlling the second distance measuring device, which forms a still photograph by exposing a photographic film to light reflected from the object, are integrally formed, the camcorder comprising a switching means connected to the first distance measuring device, the second distance measuring device, the first controller and the second controller, for performing a bi-directional automatic focus control with respect to both the camcorder and the still camera on the basis of the data of distance to the object measured by the first or second distance measuring devices.

Also, the camcorder integrally incorporates further comprises a direction adjusting means for changing the distance measuring direction of the second distance measuring device into a photographing direction of the camcorder.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
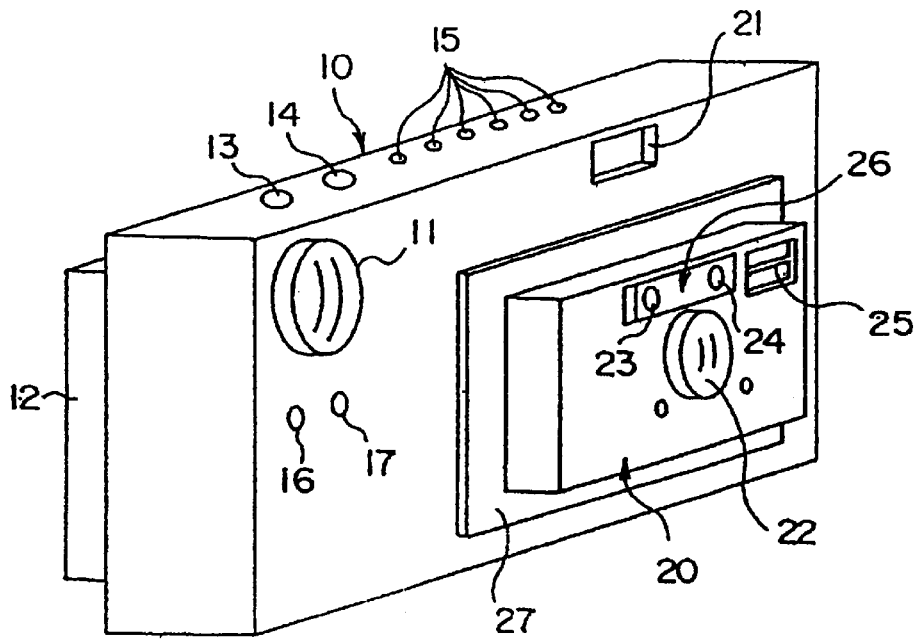
FIG. 1 is a perspective view of a camcorder integrally incorporating a still camera according to a preferred embodiment of the present invention.
Figure 2:
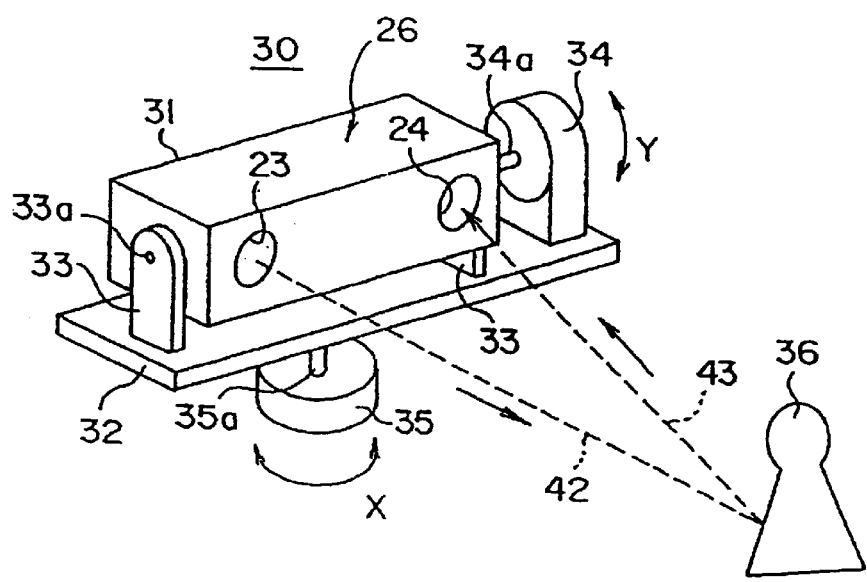
FIG. 2 is a perspective view showing the structure of a direction adjusting device for adjusting the measuring direction of a second distance measuring device for the still camera.

Referring to FIGS. 1 and 2, the camcorder integrally incorporating a still camera includes a camcorder main body 10, a camcorder lens 11 installed on the left side of the front panel, a liquid crystal display (LCD) 12 installed at the rear, a photographing switch 13 for the camcorder, a power switch 14 for the camcorder, various operating buttons 15 for operating each function of the camcorder installed on the upper surface of the camcorder main body 10. A first distance measuring device (not shown) for the camcorder for measuring distance to an object targeted by the camcorder lens 11 is installed in the camcorder main body 10. That is, the first distance measuring device for the camcorder is a well-known AF device which measures the distance by a focusing operation. Thus, the detailed descriptions of the structure of the first distance measuring device will not be repeated here.

A still camera main body 20 is attached to the right side of the camcorder lens on the front of the camcorder main body and an optical viewfinder 21 of the still camera is installed at the front of the camcorder, above the still camera main body 10. Also, a still camera lens 22, an infrared emitting element 23 for measuring distance, an infrared receiving element 24 for receiving reflected infrared signals for measuring distance, a flash 25 and the like are installed on the still camera main body 20. In addition, a shutter button 16 of the still camera and a power switch 17 of the still camera are installed below the camcorder lens 11.

The infrared emitting element 23 and the infrared receiving element 24 for measuring distance constitute a second distance measuring device 26 for the still camera. On the basis of the distance measured by the second distance measuring device 26 for the still camera, an infrared AF device moves the still camera lens 22 toward a focusing direction.

According to the AF device of the still camera which is used in a typical compact camera and the like, the distance to the object is measured based on the triangulation principle. That is, a time interval between the moment after the emission of the infrared rays from the infrared emitting element 23 and the instant of the reception of the infrared ray reflected from the object by the infrared receiving element 24 is measured for calculating the distance.

Also, the still camera main body 20 is installed on a cover 27 which is rotatably attached to the front side of the camcorder main body 10. Here, the inside of the still camera main body 20 is exposed by rotating the cover 27 so that a photographic film can be inserted into a film holder (not shown) attached to the inside of the still camera main body 20, and a magnetic tape cassette can be inserted into a cassette holder (not shown) of the camcorder main body 10.

The infrared emitting element 23 and the infrared receiving element 24 for measuring distance are installed to be rotatable in the X and Y-directions for the distance measuring direction to be adjusted by the direction adjusting device 30 as shown in FIG. 2. According to this embodiment, the infrared emitting element 23 and the infrared receiving element 24 for measuring distance are formed in the same housing 31.

Also, the housing 31 is supported to be rotatable up and down (in the Y-direction) by a shaft 33a of a bracket 33 which is formed on a base 32 for supporting the left and right sides of the housing 31. A first motor 34 capable of operating at variable speeds for rotating the housing 31 up and down (in the Y-direction) is installed on the right side of the base 32. Thus, the housing 31 is rotatably centered about shaft 33a of bracket 33 and about shaft 34a of the first motor 34.

A second motor 35 capable of operating at variable speeds for rotating the base 32 in the left and right (X-direction) is installed under the base 32. A shaft 35a of the second motor 35 is attached to the bottom of the base 32 and the base 32 is rotatably centered about shaft 35a of the second motor 35.

Thus, the direction adjusting device 30 moves the housing 31 up and down (Y-direction) using the first motor 34 and left and right (X-direction) using the second motor 35 to adjust the distance measuring direction. That is, the slopes in the X- and Y-directions, for emitting and receiving the infrared ray, of the infrared emitting element 23 and the infrared receiving element 24 for measuring distance are adjusted toward the photographing directions of the still camera lens 22 and the camcorder lens 11 when the object 36 is photographed or recorded by the still camera and the camcorder, respectively.

Thus, the second distance measuring device 26 for the still camera may be used as the second distance measuring device for the camcorder. In the AF structure of the camcorder, if a picture signal is very weak as in cases where a dark object is photographed or if there is no contrast (ratio of brightness to darkness) between the object and the background, it is difficult to adjust the focus, or the distance cannot be measured instantaneously on illuminating the flash 25. However, the camcorder integrally incorporating a still camera of this preferred embodiment can automatically control the focus of the camcorder lens 11 based on the data of distance measured by the infrared emitting element 23 and the infrared receiving element 24 even if the AF control cannot be performed by the AF device of the camcorder.

Figure 3:
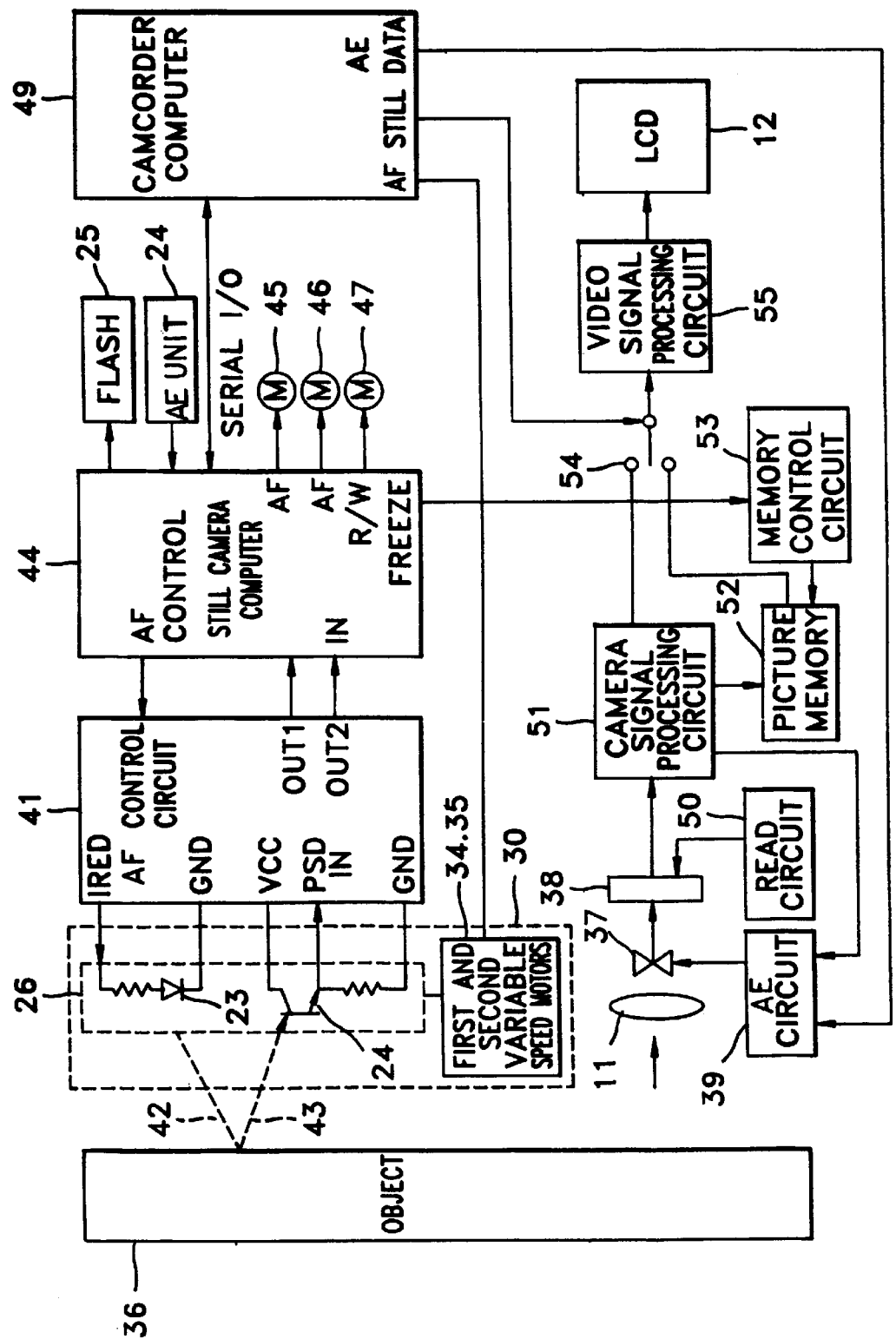
FIG. 3 is a block diagram of the components of the camcorder integrally incorporating a still camera according to the present invention.

FIG. 3 is a block diagram of the components of the camcorder integrally incorporating a still camera according to the present invention. In FIG. 3, an optical portion such as the still camera lens 22 and a shutter device, and a magnetic recording portion such as a rotary drum and a magnetic tape cassette are not shown.

In the camcorder, an image of the object is formed on a charge coupled device (CCD) image sensor 38 via the camcorder lens 11 and a shutter 37. The camcorder lens 11 is a focusing lens for the CCD 38 and constituted of approximately nine lenses. Here, in this embodiment, the camcorder lens 11 is shown as one lens to facilitate the description.

Reference numeral 41 is an AF control circuit for controlling the infrared emitting element 23 and the infrared receiving element 24 for measuring distance both of which constitute the second distance measuring device 26 for the still camera. The infrared emitting device 23 for measuring distance emits infrared rays 42 according to a command from the AF control circuit 41. The infrared rays 42 emitted from the infrared emitting element 24 for measuring distance are processed into a dot-shape by a lens (not shown) of the emitting portion and become a 10 mm-diameter beam to be irradiated on an object 36.

Also, infrared rays 43 reflected from the object 36 are received by the infrared receiving element 24 for the distance. In the AF control circuit 41, the distance to the object 36 is calculated based on the time span between the emission and reception of the infrared ray.

Reference numeral 44 represents a still camera computer which controls the AF control circuit 41, an AF motor 45 for driving the still camera lens 22, an automatic exposure (AE) motor 46 for driving a diaphragm (not shown), a rewinding/winding (R/W) motor 47 for rewinding/winding a film, an AE unit 24 and a flash 25. The AE unit 24 has an optical sensor made of a material such as a cadmium sulfide (CdS) cell having a photo conductive effect.

The still camera computer 44 outputs a control pulse for measuring distance to the AF control circuit 41 and controls the driving of the AF motor 45 based on the data of distance when the distance data is input, the distance data being measured by the infrared emitting element 23 and the infrared receiving element 24 for measuring distance. Accordingly, the still camera lens 22 moves in the focus direction to fine tune the focus on the object 36.

Also, as a detection signal is input from the AE unit 24 according to the illumination, the still camera computer 44 drives the AE motor 46 to open a diaphragm (not shown) to allow proper amounts of light into the still camera and simultaneously activates the flash 25 when the amount of illumination is below a predetermined value. Also, when the shutter button 16 is pressed, a shutter device (not shown) is opened and closed at a predetermined speed directed by the still camera computer 44 and an image being transmitted through the still camera lens 22 is formed on the film.

In addition, reference numeral 49 represents a camcorder computer which is connected to the still camera computer 44 via a serial signal line and exchanges data, e.g. distance data, with the still camera computer 44. Also, the camcorder computer 49 controls each device of the still camera via the serial signal line as the power of the camcorder computer 49 is turned on.

When electrically recording a still picture via the camcorder lens 11, the output of the CCD 38 is input to a camera signal processing circuit 51 in a predetermined period by a signal from a read circuit 50. Also, the camcorder computer 49 controls the driving of a camcorder AF device (not shown) to maximize a high frequency component of the picture signal obtained from the CCD 38, thereby moving the camcorder lens 11 in the focus direction.

Reference numeral 52 represents a picture memory for storing picture signals output from the CCD 38, reference numeral 53 represents a memory control circuit for outputting a command signal for storing the picture signal in the picture memory 52 in accordance with a still picture recording signal (FREEZE) output from the still camera computer 44. Thus, the picture memory 52 reads the picture signal from the CCD 38 initiated by the rising edge of the still picture recording signal and stores the picture signal as a still picture therein. That is, a timing for storing the picture signal in the picture memory 52 is predetermined by the still camera computer 44 to be matched with the degree of film sensitivity and maximum illumination timing of the flash 25.

Reference numeral 54 represents a moving/still picture switch for switching the connection of the camera signal processing circuit 51 or the picture memory 52 by a switching signal from the camcorder computer 49. Reference numeral 55 represents a video signal processing circuit which displays the moving/still picture read from the signal processing circuit 51 of the picture memory 52 by the moving/still picture switch 54 in the LCD 12.

While the still camera starts to wind the film, the picture displayed in the LCD 12 is switched into a memorized picture which is read from the picture memory 52 by the moving/still picture switch 54. This picture from the picture memory 52 is magnetically recorded on a magnetic tape (not shown) during the film winding period through still picture recording and sound muting recording processes. As described above, the magnetic recording is performed by pausing a still picture for several seconds, so that this cut can be remained as a photograph.

In the camcorder integrally incorporating a still camera, when the object 36 is photographed by a typical camcorder under high illumination, the distance to the object 36 can be precisely measured by the distance measuring device of the camcorder. As a result, the camcorder lens 11 properly moves according to the measured distance data.

Here, an exemplary application of storing a picture signal via the camcorder lens 11 in the picture memory 52 will be described.

First, there is an instant camera function. According to the instant camera function, an instantaneously captured picture is displayed as a still picture in the LCD 12. Also, the picture signal of the picture displayed in the LCD 12 is stored in the picture memory 52 or a magnetic tape. That is, by this function, even if the shutter button 16 for the still camera is pressed without a film, the instantaneously captured picture can be displayed in the LCD 12.

As a second example, there is a flash recording function. According to this flash recording function, while flash photography is being performed by illuminating the object with flash 25 of the still camera one time or periodically, the picture photographed at the moment is displayed in the LCD 12 and the picture is stored in the picture memory 52 or the magnetic tape. That is, since it takes about three seconds to charge the flash 25, the flash photography is executed every three seconds so that the picture photographed by the illumination of the flash 25 can be recorded.

Also, the AF device of the camcorder moves the camcorder lens 11 in the focus direction to maximize the high frequency component of the picture signal output from the CCD 38 as described above, so that it is difficult to focus the object in the dark or when there is little or no contrast between the object and the background, and the response speed of the object to the distance measurement is slow.

These problems can be solved by moving the camcorder lens 11 in the focus direction using the data of distance measured by the second distance measuring device 26 adopting an infrared mode which is installed in the still camera.

However, the camcorder lens 11 and the still camera lens 22 are separated from each other in the lateral and vertical directions as described above. Thus, as an example, when photographing the object using the still camera while viewing the picture displayed in the LCD 12, there is parallax between the picture displayed in the LCD 12 and the object being photographed by the still camera. Also, when photographing the object using both the still camera and the camcorder while viewing the object through the optical viewfinder 21, there is parallax between the picture photographed on the film and the object being recorded by the camcorder. That is, since the distance measuring direction of the second distance measuring device 26 for the still camera is toward the photographing direction (front), the distance measuring direction of the second distance measuring device 26 does not match that of the photographing direction of the camcorder.

Figure 4A:
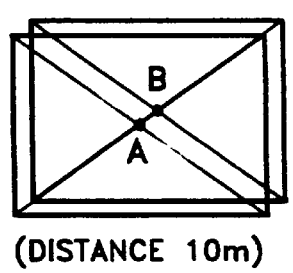
FIGS. 4A and 4B are diagrams showing examples of parallax between the still camera and the camcorder in focusing on an object at a distance of 10 m and 1 m, respectively.
Figure 4B:
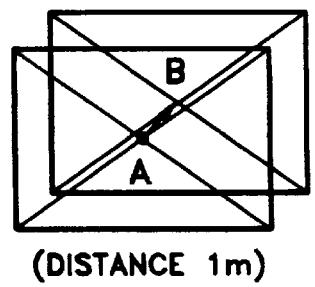

FIGS. 4A and 4B show the parallax between the camcorder lens 11 and the still camera lens 22 in focusing on the object 36 at a distance from the lens of 10 m and 1 m, respectively. Here, a point A represents the position of optical axis of the still camera lens 22 and a point B represents the position of optical axis of the camcorder lens 11.

As shown in FIG. 4A, when the object 36 is separated from the lenses by 10 m, the parallax is comparatively small, particularly, at the centers of the camcorder lens 11 and the still camera lens 22. However, when the distance from the lenses to the object is 1 m, the parallax is comparatively great and considerable, particularly at the centers of the camcorder lens 11 and the still camera lens 22 as shown in FIG. 4B. Thus, as the distance from the lenses to the object 36 gets shorter, the parallax increases and the conflict of the two pictures, one of which is stored in the picture memory 52 and the other of which is photographed by the still camera, becomes great.

Also, in the preferred embodiment of the present invention, the camcorder lens 11 is installed at the same height as that of the optical viewfinder 21. Thus, if the object is photographed by the camcorder while viewing the object through the optical viewfinder 21, the parallax exists in only the lateral direction.

In the first distance measuring device for the camcorder, it is difficult to focus an object under dark conditions or when a contrast between the object and the background does not exist. Also, the response speed of the distance measurement circuitry becomes slow. In this case, the camcorder computer 49 moves the camcorder lens 11 into a focusing position based on the data of distance to the object 36 measured by the second distance measuring device 26 for the still camera.

Here, it is assumed that the object is photographed using the LCD 12 as a view finder. In this case, the object 36 located in front of the camcorder 11 is at odd angles from the emitting and receiving directions of the second distance measuring device 26. Thus, according to the preferred embodiment, the second distance measuring device 26 having the infrared emitting element 23 and the infrared receiving element 24 for measuring distance is rotated toward the camcorder lens 11 by driving the second motor 35 of the above-described direction adjusting device 30. Here, when intending to rotate the second distance measuring device 26 in the lateral direction, a rotation angle of the second distance measuring device 26 is predetermined according to the distance from the lens to the object.

According to the camcorder integrally incorporating a still camera of the present invention, a picture can be stored in the picture memory 52 and the like using the above instant camera function or the flash recording function. That is, this storing of the picture can be achieved by using the data of distance measured by the second distance measuring device 26 for the still camera as auxiliary data for the first distance measuring device for the camcorder under the above undesirable condition for photographing the object using the camcorder.

Figure 5:
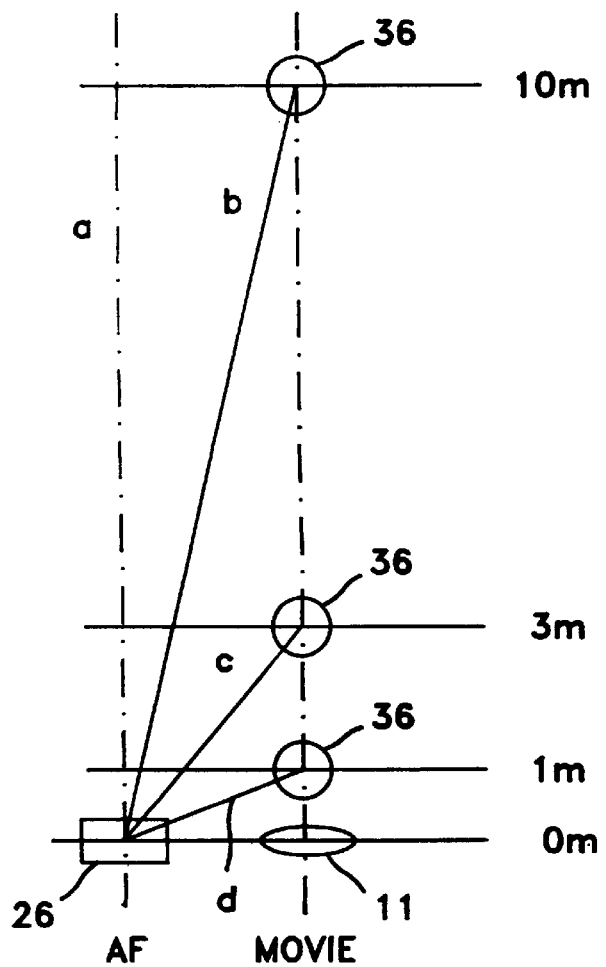
FIG. 5 is a plan view for illustrating the operation of changing the measuring direction of the second distance measuring device for the still camera.

FIG. 5 is a plan view showing the rotation of the second distance measuring device 26 to the right.

According to this embodiment, when intending to rotate the second distance measuring device 26, the measuring distance from the second distance measuring device 26 to the object is set at infinity ($\infty$), 10 m, 3 m and 1 m each distance represented by reference characters a, b, c and d, respectively. Also, the rotation angles corresponding to each distance are predetermined. Thus, the second distance measuring device 26 is rotated by the driving of the second motor 35 of the direction adjusting device 30 by a predetermined angle to measure the distance from the second distance measuring device 26 itself to the object 36 located at an optical axis B of the camcorder lens 11.

Also, the second distance measuring device 26 outputs the data of distance by detecting the infrared rays using the infrared receiving element 24 for measuring distance, the infrared rays having been emitted from the infrared emitting element 23 and then reflected from the object 36. For example, when the object 36 is separated from the second distance measuring device 26 by over 10 m, the data of distance becomes infinity regardless of the rotation position of the second distance measuring device 26. Also, when the object is located at any distance from the measuring device 26 between 10 m and 1 m, variations in the data of distance which is determined by receiving the infrared rays reflected from the object 36 at the infrared ray receiving element 24 are minimal. Thus, the rounded value is output as the data of distance.

Figure 6:
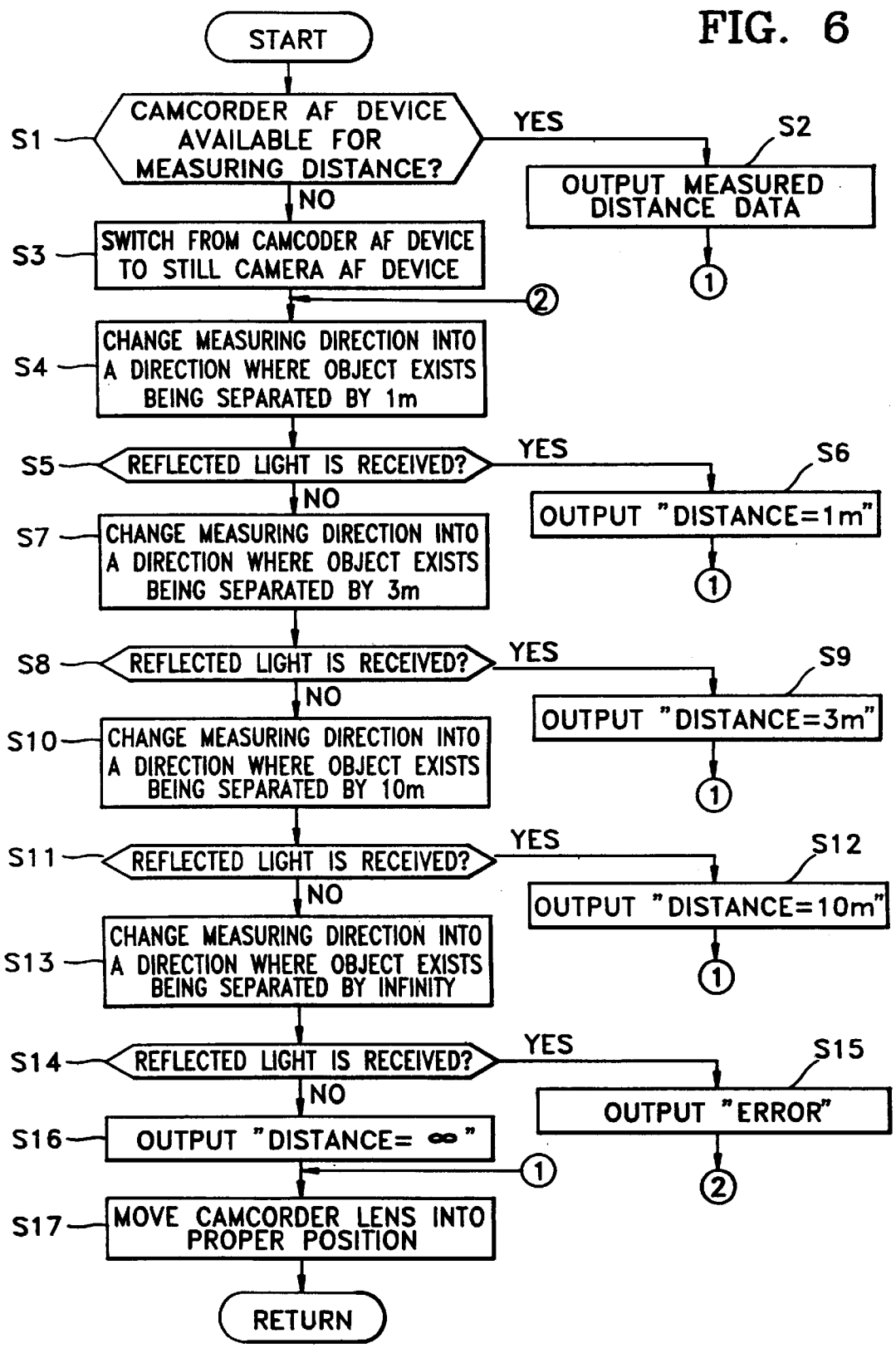
FIG. 6 is a flowchart for illustrating the process performed by the camcorder computer.

FIG. 6 is a flowchart of illustrating the process of measuring the distance to the object as performed by the camcorder computer 49. When the shutter button 16 is pressed while the instant camera function or the flash recording function is set, the Camcorder computer 49 checks whether it is possible to measure the distance to the object 36 using the first distance measuring device installed in the AF device of the camcorder (step S1).

If there is enough illumination on the object 36 to be photographed and the distance to the object can be measured by the AF device of the camcorder, the data of distance measured by the AF device of the camcorder is output (step S2).

However, if the object 36 is dark or there is no contrast between the object and the background even though the conditions of step S1 are satisfied, step S3 is performed due to difficulty in focusing on the object. That is, in step S3, the AF device of the camcorder is switched to the AF device of the still camera to perform the focusing control of the camcorder lens 11 based on the data of distance measured by the second distance measuring device 26.

Then, the measuring direction of the second distance measuring device 26, that is, the emitting and receiving directions, is changed to match the direction of the object 36 being separated by 1 m to coincide with the optical axis of the camcorder lens 11 (step S4). That is, the second distance measuring device 26 is moved toward the optical axis direction of the camcorder lens 11 together with the base 32 by driving the second motor 35 of the direction adjusting device 30, and the second motor 35 stops when the measuring direction matches with the direction where the object 36 would be if it was separated by 1 m. Then, the infrared ray is emitted from the infrared emitting device 23 of the second distance measuring device 26.

In step S5, infrared rays reflected from the object 36 are checked to determine whether they are received by the infrared receiving element 24. In general, if the object 36 is located so that it is separated from the camcorder lens 11 by 1 m, the infrared rays reflected by the object 36 can be received by the infrared receiving element 24 for the distance. Thus, if it is determined in the step S5 that the infrared rays reflected from the object 36 is received by the infrared receiving element 24, the measured distance data is output as 1 m in step S6.

On the contrary, if the infrared receiving element 24 fails to receive the infrared rays reflected from the object 36 in step S5 due to the absence of the object 36 at that position, step S7 is performed. That is, in step S7, the second distance measuring device 26 is rotated to the left by the second motor 35 of the direction adjusting device 30, and the second motor 35 stops when the measuring direction of the second distance measuring device 26 matches with the position where the object 36 would be if it was separated from the camcorder lens 11 by 3 m. Then, the infrared rays are emitted from the infrared emitting device 23 of the second distance measuring device 26.

Thereafter, step S8 determines whether the infrared rays reflected from the object 36 is received by the infrared receiving element 24. Generally, if the object 36 is located so that it is separated from the camcorder lens 11 by 3 m, the infrared rays reflected by the object 36 can be received by the infrared receiving element 24 for the distance. Thus, if it is determined in step S8 that the infrared rays reflected from the object 36 are received by the infrared receiving element 24, the measured data of distance is output as 3 m in step S9.

However, if the infrared receiving element 24 fails to receive the infrared rays reflected from the object 36 in the step S8 due to the absence of the object 36 at that position, step S10 is performed. That is, in the step S10, the second distance measuring device 26 is rotated by the second motor 35 of the direction adjusting device 30 to change the measuring direction of the second distance measuring device 26 into a direction where the object 36 would be if it was separated from the camcorder lens 11 by 10 m. Then, the infrared rays is emitted from the infrared emitting device 23 of the second distance measuring device 26.

Then, step S11 determines whether the infrared rays reflected from the object 36 is received by the infrared receiving element 24. If the object 36 is located so that it is separated from the camcorder lens 11 by 10 m, the infrared rays reflected by the object 36 can be received by the infrared receiving element 24 for measuring the distance. Thus, if it is determined in step S8 that the infrared rays reflected from the object 36 is received by the infrared receiving element 24, the measured data of distance is output as 10 m in the step S12.

However, if the infrared receiving element 24 fails to receive the infrared rays reflected from the object 36 in step S11 due to the absence of the object 36 at that position, step S13 is performed. That is, in step S13, the second distance measuring device 26 is rotated by the second motor 35 of the direction adjusting device 30 to change the measuring direction of the second distance measuring device 26 into the front direction thereof (here, the distance from the second distance measuring device 26 is infinity). Then, the infrared rays are emitted from the infrared emitting device 23 of the second distance measuring device 26 toward the front.

In the next step S14, it is determined whether the infrared rays reflected from the object 36 are received by the infrared receiving element 24. If the object 36 is located so that it is separated from the camcorder lens 11 by over 10 m, the infrared rays reflected by the object 36 cannot be received by the infrared receiving element 24 for measuring distance. Thus, if it is determined in-step S14 that the infrared rays reflected from the object 36 is received by the infrared receiving element 24, an error message is output (step S15) and then the process returns to step S4 to perform the distance measuring process again.

However, if it is determined in step S14 that the infrared rays reflected from the object 36 are not received by the infrared receiving element 24, the data of distance is output as infinity in step S16. Then, a focus control to the camcorder lens 11 is performed based on the data of distance measured by the second distance measurement device 26 in step S17. As a result, even if the object 36 is in the dark or there is no contrast between the object 36 and the background, the camcorder lens 11 is moved to a proper position to automatically the the focus of on the object 36.

Also, if other objects are behind the object 36, a plurality of distance data are output. In this case, the focus control to the camcorder lens 11 is performed using the minimum distance data of the plurality of distance data as the distance to the object 36. Thus, the distance data is selected according to the background of the object 36 and the focus of the camcorder lens 11 is appropriately set.

As described above, when the AF device of the camcorder is not available for focus control, the focus control function is switched over to the AF device of the still camera to control the focus of the camcorder lens 11 based on the data of distance measured by the second distance measuring device 26. Thus, when the object 36 is in the dark or there is no contrast between the object 36 and the background, the focus of the camcorder can be set appropriately. Thus, the picture captured by the above-described instant camera function or the flash recording function can be stored in the picture memory 52. Also, since the picture stored in the picture memory 52 is captured with the same focus as the picture photographed by the still camera, the object 36 can be recorded having the same picture as that photographed by the still camera.

Also, the distance measuring direction of the second distance measuring device 26 is adjusted to be on the optical axis B of the camcorder lens 11, so that the distance to the object displayed at the center of the LCD 12 is measured. Thus, when the AF device of the camcorder is not available, the object can be photographed using the LCD 12 as a finder. As a result, focusing parallax does not occur when the optical viewfinder 21 is used.

That is, when using the LCD 12 as a viewfinder of the still camera, the focus of the camcorder is automatically controlled based on the data of distance measured by the second distance measuring device 26 for the still camera, thereby correcting the focus conflict.

As described above, the focus direction of the camcorder lens 11 is changed based on the data of distance measured by the second distance measuring device 26 while changing the measuring direction of the second distance measuring device 26 for the still camera. According to the camcorder integrally incorporating a still camera of the preferred embodiment, an intended picture can be stored in the picture memory 52 when parallax occurs between the camcorder lens 11 and the still camera lens 22 or when the focus control of the camcorder and the still camera do not match each other or when a target focusing position is not determined in the AF device of the camcorder, or when flash recording is performed.

In addition, in the case where parallax exists in the vertical direction, the second distance measuring device 26 is rotated in the vertical direction a predetermined angle corresponding to each predetermined distance in the same manner as when parallax exists in the lateral direction to measure the distance to the object 36.

That is, according to the above embodiment, the focus control by the AF device of the camcorder is performed based on the data of distance measured using the AF device of the still camera. However the present invention is not limited to the above and the focus control by the AF device of the still camera may be performed based on the data of distance measured using the AF device of the camcorder.

As described above, according to the camcorder integrally incorporating a still camera, the foci of both the camcorder and the still camera can be automatically controlled based on the data of distance to the object measured by the first or second distance measuring device. Thus, when a display portion displaying a picture captured by the camcorder is used as a viewfinder of the still camera, the focus of the camcorder is automatically controlled based on the data of distance measured by the second distance measuring device for the still camera, thereby correcting the focus conflict caused from the parallax between two distance measuring devices. Also, when photographing the object using the camcorder while viewing the object through the optical viewfinder, the focus is adjusted by the camcorder to match the picture recorded on film.

In addition, the camcorder integrally incorporating a still camera of the present invention has a switching means for automatically controlling the focus of the camcorder based on the data of distance measured by the second distance measuring device for the still camera. Thus, when using a display device in which a picture photographed by the camcorder is displayed as a viewfinder of the still camera, the first distance measuring device for the camcorder can be switched over to the second distance measuring device for the still camera, and the focus can be properly adjusted even if the object is in the dark or contrast between the object and the background does not exist.

Further, since the camcorder integrally incorporating a still camera of the present invention includes a direction adjusting device for changing the distance measuring direction of the second distance measuring device for the still camera, the automatic focus control of the camcorder can be performed using the data of distance measured by the second distance measuring device for the still camera even when the first distance measuring device for the camcorder is not available.

Further, according to the camcorder integrally incorporating a still camera of the present invention, a picture photographed by the second distance measuring device for the still camera is stored in a picture memory. Thus, when the object is in the dark or there is no contrast between the object and the background, the exact distance can be measured and the picture photographed using a flash can be stored in the picture memory.

Also, since the camcorder integrally incorporating a still camera of the present invention includes a direction adjusting device for changing the distance measuring direction of the second distance measuring device for the still camera toward the direction of the object being displayed at the center of the display device during the operation of the camcorder or the display device, the exact distance to the object displayed at the center of the display device can be measured using the second distance measuring device for the still camera even when the first distance measuring device for the camcorder is not available. Also, the automatic focusing control can be accurately performed with respect to the object displayed at the center of the display device, so that the still camera can be focused to the same object.

What is claimed is:

1. A camcorder integrally incorporating a still camera, comprising:

a camcorder, having a first distance measuring device for measuring a first distance to an object, which records a signal of moving pictures of the object on a magnetic tape;

a still camera, having a second distance measuring device for measuring a second distance to the object, which forms a still photograph by exposing a photographic film to light reflected from the object, said still camera integrally formed with said camcorder; and an automatic focus controlling means for performing a bi-directional automatic focus control with respect to both said camcorder and said still camera on the basis of data of distance to the object measured by one of said first and second distance measuring devices.

2. A camcorder integrally incorporating a still camera as claimed in claim 1, wherein said automatic focus controlling means comprises a switching means for performing an automatic focus control of camcorder on the basis of data of distance measured by said second distance measuring device installed in the still camera.

3. A camcorder integrally incorporating a still camera as claimed in claim 1, wherein said automatic focus controlling means further comprises a direction adjusting means for changing the measuring direction of said second distance measuring device so as to align with photographing direction of the camcorder such that said measuring direction is substantially oriented from said second distance measuring device to said object.

4. A camcorder integrally incorporating a still camera as claimed in claim 1, wherein said first distance is a distance between said object and a camcorder lens of said camcorder and said second distance is a distance between said object and a still camera lens of said still camera.

5. A camcorder integrally incorporating a still camera as claimed in claim 1, wherein said first distance measurement device and said second distance measuring device respectively measure said first distance and said second distance independently of each other.

6. A camcorder integrally incorporating a still camera comprising:

a camcorder for recording motion picture signals of an object, wherein said camcorder contains a camcorder distance measuring device for measuring a first distance to said object;

a still camera for forming a still photograph by exposing a photographic film to light reflected from said object are integrally formed, wherein said camcorder includes a picture memory for storing said picture image signals, and wherein said camcorder comprises means for controlling the storage of the picture image signals in said picture memory on the basis of distance data corresponding to a second distance to said object measured by a camera distance measuring device installed in the still camera.

7. A camcorder integrally incorporating a still camera as claimed in claim 6, further comprising:

wherein said camera distance measuring device installed in said still camera measures a distance between said object and a still camera lens of said still camera, and wherein said camcorder distance measuring device installed in said camcorder measures a distance between said object and a camcorder lens of said camcorder.

8. A camcorder integrally incorporating a still camera as claimed in claim 6, wherein said camera distance measurement device and said camcorder distance measuring device respectively measure said first distance and said second distance independently of each other.

9. A camcorder integrally incorporating a still camera, comprising:

a camcorder, having a first distance measuring device for measuring a first distance to an object, which records a signal of moving pictures of the object on a magnetic tape;

a still camera, having a second distance measuring device for measuring a second distance to the object, which forms a still photograph by exposing a photographic film to light reflected from the object, said still camera being attached to said camcorder;

a display device for displaying pictures recorded by the camcorder; and a direction adjusting means for changing distance measuring direction of said second distance measuring device so that it corresponds to the direction of the object displayed at the center of the display device.

10. A camcorder integrally incorporating a still camera as claimed in claim 9, wherein said first distance is a distance between said object and a camcorder lens of said camcorder and said second distance is a distance between said object and a still camera lens of said still camera.

11. A camcorder integrally incorporating a still camera as claimed in claim 9, wherein said first distance measurement device and said second distance measuring device respectively measure said first distance and said second distance independently of each other.

12. A camcorder integrally incorporating a still camera, comprising:

a camcorder, having a first distance measuring device for measuring a first distance to an object and a first controller for controlling said first distance measuring device, which records a signal of moving pictures of an object on a magnetic tape;

a still camera, having a second distance measuring device for measuring a second distance to the object and a second controller for controlling said second distance measuring device, which forms a still photograph by exposing a photographic film to light reflected from the object; and a switching means connected to said first distance measuring device, said second distance measuring device, said first controller and said second controller, for performing a bi-directional automatic focus control of the camcorder and the still camera on the basis of distance data measured by one of said first and second distance measuring devices.

13. A camcorder integrally incorporating a still camera as claimed in claim 12, further comprising a direction adjusting means for changing the distance measuring direction of said second distance measuring device to align with a photographing direction of the camcorder such that the distance measuring direction is substantially oriented from said second distance measuring device to said object.

14. A camcorder integrally incorporating a still camera as claimed in claim 12, wherein said first distance is a distance between said object and a camcorder lens of said camcorder and said second distance is a distance between said object and a still camera lens of said still camera.

15. A camcorder integrally incorporating a still camera as claimed in claim 12, wherein said first distance measurement device and said second distance measuring device respectively measure said first distance and said second distance independently of each other.

16. A camcorder integrally incorporating a still camera, comprising:

a camcorder which records a video signal on a magnetic tape and comprises a camcorder lens and a first distance measuring device, wherein said first distance measuring device measures a first distance corresponding to a distance between an object and said camcorder lens during a first operational mode;

a still camera which is integrally formed with said camcorder, forms a still photograph of said object on a photographic film, and which comprises a camera lens and a second distance measuring device, wherein said second distance measuring device measures a second distance corresponding to a distance between said object and said camera lens; and an adjusting circuit coupled to said second distance measuring device which changes a measuring direction of said second distance measuring device during a second operational mode such that said second distance measuring device measures a third distance corresponding to said distance between said object and said camcorder lens.

17. A camcorder integrally incorporating a still camera as claimed in claim 16, wherein said second distance measuring device comprises:

an emitter which emits a signal towards said object which reflects said signal as a reflected signal;

a receiver which receives said reflected signal; and a processor which determines said third distance based on when said receiver receives said reflected signal.

18. A camcorder integrally incorporating a still camera as claimed in claim 16, wherein said second operational mode occurs when one of said object is dark and a contrast between said object and a surrounding background is small.

19. A camcorder integrally incorporating a still camera as claimed in claim 16, wherein said adjusting circuit comprises a first motor which rotates said second distance measuring device around a vertical axis.

20. A camcorder integrally incorporating a still camera as claimed in claim 19, wherein said adjusting circuit further comprises a second motor which rotates said second distance measuring device around a horizontal axis.

21. A camcorder integrally incorporating a still camera as claimed in claim 19, wherein said camcorder lens and said camera lens are disposed along a common horizontal axis.

22. A camcorder integrally incorporating a still camera as claimed in claim 16, wherein said first distance measurement device and said second distance measuring device respectively measure said first distance and said second distance independently of each other.

23. A method for measuring a distance in an apparatus in which a camcorder is integrally formed with a still camera, wherein said camcorder has a first distance measuring device which measures a first distance between a camcorder lens of said camcorder and an object, wherein said still camera has a second distance measuring device which measures a second distance between a camera lens of said still camera and said object, and wherein said method comprises the steps of:

(a) changing a position of said second distance measuring device to face a first predetermined angle with respect to said apparatus;

(b) determining if said second distance measuring device perceives said object while said second distance measuring device is positioned to face said first predetermined angle; and (c) determining that said object is located a first predetermined distance away from said camcorder lens if said object is perceived in said step (b).

24. The method as claimed in claim 23, further comprising the steps of:

(d) changing said position of said second distance measuring device to face a second predetermined angle with respect to said apparatus if said object is not perceived in said step (b);

(e) determining if said second distance measuring device perceives said object while said second distance measuring device is positioned to face said second predetermined angle; and (f) determining that said object is located a second predetermined distance away from said camcorder lens if said object is perceived in said step (e).

25. The method as claimed in claim 24, wherein said first predetermined angle is greater than said second predetermined angle and said first predetermined distance is greater than said second predetermined distance.

26. The method as claimed in claim 24, further comprising the steps of:

(g) changing said position of said second distance measuring device to face substantially parallel to an optical axis of said camera lens; and (h) determining if said second distance measuring device perceives said object while said second distance measuring device is positioned to face substantially parallel to said optical axis; and (i) determining that said object is effectively located at an infinite distance away from said camcorder lens if said object is not perceived in said step (h).

27. The method as claimed in claim 26, further comprising the step of:

(j) determining that an error has occurred if said object is perceived in said step (h).

28. The method as claimed in claim 23, further comprising the steps of:

(d) determining if said first distance measuring device can accurately determine said first distance;

(e) measuring said first distance with said first distance measuring device if said first distance measuring device can accurately determine said first distance; and (f) performing said step (a) if said first distance measuring device cannot accurately determine said first distance.

29. The method as claimed in claim 23, wherein said first distance measurement device and said second distance measuring device respectively measure said first distance and said second distance independently of each other.

* * * * *